June 24, 1930.     E. K. BAKER     1,765,785
SPARE WHEEL CARRIER
Filed April 26, 1926
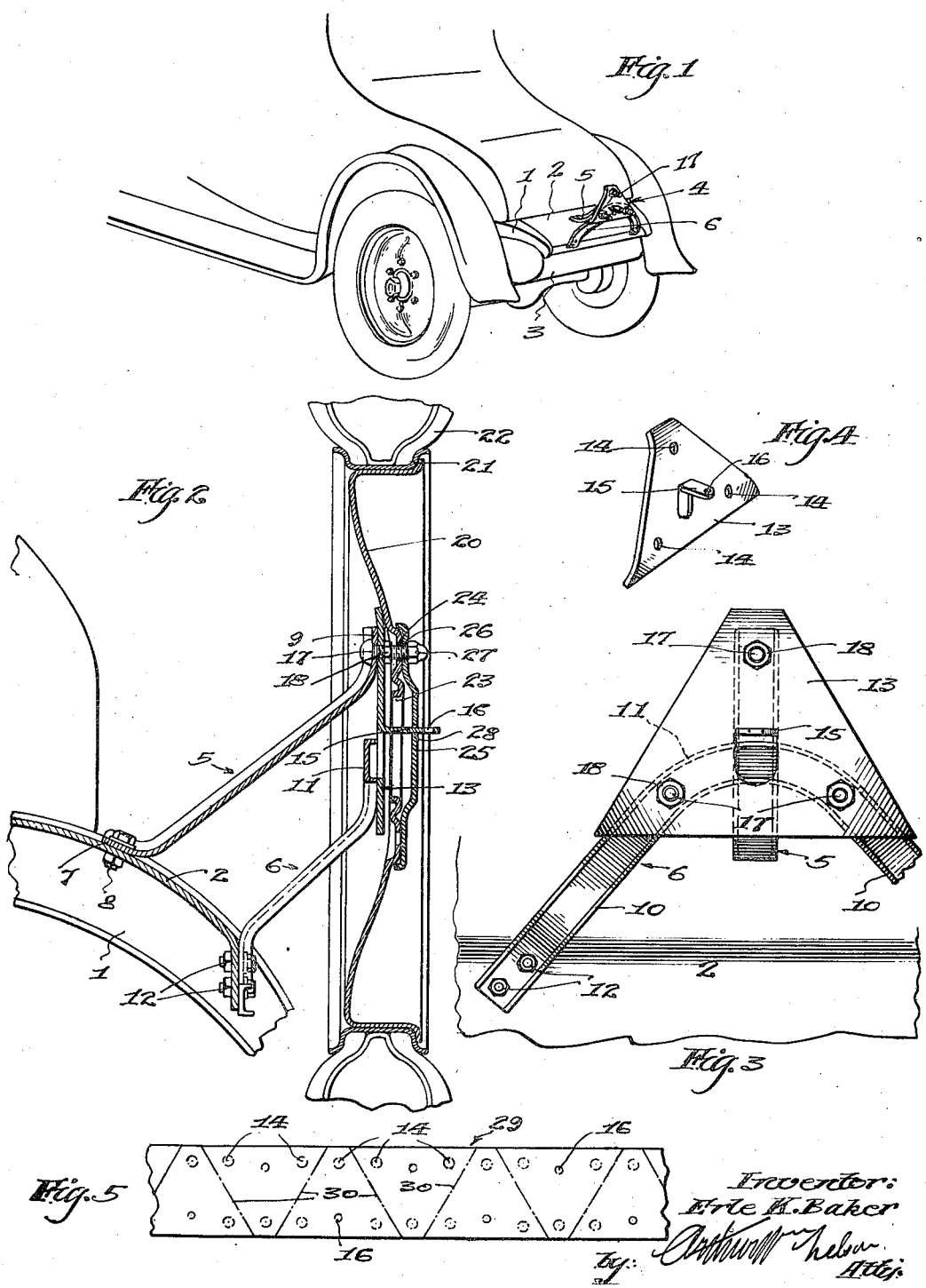
Inventor:
Erie K. Baker Patented June 24, 1930

1,765,785

UNITED STATES PATENT OFFICE

ERLE K. BAKER, OF CHICAGO, ILLINOIS

SPARE-WHEEL CARRIER

Application filed April 26, 1926. Serial No. 104,691.

This invention relates to improvements in spare wheel carriers for automobiles and it consists of the matters hereinafter described and more particularly pointed out in the appended claims.

The primary object of the invention is to provide a spare wheel carrier, which consists of but a few parts readily produced, some from ordinary stock purchasable in open market and others formed from flat strip without waste, thus reducing the cost of manufacture thereof to a minimum.

A further object of the invention is to provide a spare wheel carrier, especially adapted for use on the rear end of an automobile and from which the spare wheel may be readily removed, and as readily replaced when it is desired to do so.

Still another object of the invention is to provide a device including a plurality of arms fixed at one end to the automobile and so connected at their other ends to a wheel engaging plate, that the act of applying a wheel, auomatically tightens the connection between said arms and plate.

Still a further object of the invention is to provide a spare wheel carrier which includes a substantially triangular wheel engaging plate, which may be rapidly produced in great numbers at a low cost and without waste.

These objects of the invention as well as others together with the many advantages thereof will more fully appear as I proceed with my specification.

In the drawing:—

Fig. 1 is a perspective view of the rear end of an automobile, showing my improved spare wheel carrier thereon as it appears with the spare wheel removed therefrom.

Fig. 2 is a vertical sectional view through the carrier with a spare wheel of the disc type mounted thereon.

Fig. 3 is a fragmentary view in rear elevation of my improved spare wheel carrier with the wheel removed therefrom.

Fig. 4 is a perspective view of a wheel engaging plate embodied in my improved spare wheel carrier.

Fig. 5 is a diagrammatic view illustrating the method employed in blanking out the wheel engaging plate shown in Fig. 4, without waste of material.

My improved spare wheel carrier is herein illustrated and will be herein described as being adapted to receive a spare wheel of the disc type, but this is for the purpose of illustration only and is not to be considered as by way of limitation because it may also be employed to receive wheels of other kinds and not necessarily disc wheels alone.

Referring now in detail to that embodiment of the invention illustrated in the accompanying drawings: 1—1 indicates the rear downwardly curved ends of the side frame members of an automobile and 2 indicates in the present instance a fixed part of the automobile, such as the protecting apron which extends between said frame member end to cover the gasoline tank 3 of said automobile. 4 indicates as a whole my improved spare wheel carrier which is mounted on the rear end of the automobile.

Said carrier includes two plate supporting arms 5 and 6 respectively, each made from metallic stock readily purchasable in open market, such as for instance, a relatively light weight channel iron. The arm 5 has its bottom end 7 bent to fit upon one point of the apron 2 along its median line and is secured thereto as by the bolt and nut 8. The other or top end 9 of said arm is bent to extend into a vertical plane spaced rearwardly from the plane of attachment of its bottom end to said apron and the flanges of the channel of said arm are directed forwardly toward the body of the automobile. The other arm 6 is a duplex arm and is substantially of an inverted V shape form as best shown in Fig. 3. Said arm includes diverging arm portions 10 and a top connecting and curved crotch portion 11. The bottom ends of the arm portions 10 are bent into a vertical plane and are secured at transversely spaced points to the rear margin of the apron 2 by bolts and nuts 12, while the crotch portion is also bent to extend into a vertical plane coincident with that of the top part 9 of the arm 5. In the case of the duplex arm which as before stated is also made of channel iron, its flanges are directed rearwardly or away from the automobile as best shown in Fig. 2.

Associated with the top end 9 of the arm 5 and with the crotch portion 11 of the duplex arm 6 is a wheel engaging plate 13 best shown in Figs. 3 and 4. Said plate is preferably of a truncated triangular shape and in its base portion which is horizontally disposed is provided openings or holes 14—14 (see Fig. 4) while in its truncated top end is provided a third opening 14, all disposed 120° apart about a common axis located near the middle of said plate. Near the center of said plate is an outstanding ear 15 formed by punching out a portion of said plate and in said ear is an opening 16 the purpose of which will appear later.

The holes 14 in said plate register with suitable holes in the top end portion 9 of the arm 5 and in the crotch portion 11 of the duplex arm 6 respectively and through said registering holes from the rear of said arms, bolts 17 extend. Clamping nuts 18 are provided on the bolts to secure the plate in position upon said arm portions. Said bolts are preferably long enough to extend a suitable distance beyond said plate for a reason to appear later.

As before stated I have illustrated the device as carrying a wheel of the demountable disc type. 20 indicates the disc of said wheel, 21 indicates the rim and 22 indicates the tire carried by said rim. The central portion of the disc which cambers rearwardly has the usual hub barrel opening 23 and spaced concentric about said opening are holes 24 to receive the usual bolts on the hub flange in the manner well known. There are a plurality of such holes 24 usually six of them and alternate holes will register with the bolts 17 so that when the wheel is on the carrier the threaded ends of the bolts 17 will extend through said alternate holes 24. To fit the camber of the disc the corner portions of the plate are cambered rearwardly as shown in Figs. 2 and 4. After the wheel disc is positioned as described, a finishing plate 25 is applied to the outer surface of central portion of the disc which finishing plate also has holes 26 so disposed that the ends of the bolts 17 will also project through said holes, after which cap nuts 27 are threaded on said bolt ends to clamp the wheel to the carrier. It is here pointed out, that even though the nuts 18 become loose, the act of drawing up on the cap nuts 27 will securely tighten all the parts associated with the bolts 17. In the finishing plate 25 is an opening 28 through which the ear 15 of the plate 13 will extend when said finishing plate is applied, after which the U shaped yoke of a suitable lock is inserted through the opening 16 to lock the wheel against removal by unauthorized persons.

In the manufacture of my improved carrier, the arms 5 and 6 are made from suitable lengths of channel iron bent to form and punched to provide the various bolt holes. In the manufacture of the wheel engaging plates 13, the same is produced in a novel manner from flat strip stock of suitable width. Such a strip is shown in Fig. 5 and bears the reference numeral 29. The strip is fed to a suitable die press and is severed on diagonal lines 30—30 which extend transversely of the strip at oppositely disposed angles as best shown in Fig. 5. At the same time, the holes 14—14 and 16 are also formed so that the number of blanks thus made at each operation of the press depends upon the size of the die employed. Preferably the die is a multiple die capable of forming at least two blanks for each press operation. The plate blanks thus far finished are passed through another operation which cambers its corners and forms the ear 15. Thus in the finished plate its parallel base and truncated edges are formed from the edges of the strip and the converging side edges are formed during the cutting of the strip into blank form. From Fig. 5 it is apparent that by the arrangement of cutting the strip as described there is no waste in the strip except that which must occur at the ends only of each strip operated upon. Such wheel engaging plates may be produced in great numbers at an extreme low cost as is apparent.

To remove or demount the wheel from the carrier, the lock before mentioned as used in connection with the ear 15 must of course be removed, after which the cap nuts 27 are removed. Thereafter the finishing plate is taken off and the wheel as a whole is exposed for removal.

My improved carrier comprises but a few parts which though light in weight, are rugged enough to withstand the duty strains imposed upon them. The said parts may be readily made and assembled and this without wastage in the production thereof.

While in describing my invention, I have referred to certain details of construction as well as form and arrangement of the parts thereof, I do not wish to be limited thereto except as may be pointed out in the appended claims.

I claim as my invention:—

1. In a spare wheel carrier, a central arm and a duplex member comprising diverging arms, a substantially triangular wheel disc engaging plate, a bolt carried by the central arm, and extending through one corner of said plate and other bolts extending through the diverging arms of the duplex member and through the other two corners of the plate, all the corners of said plate conforming to the wheel disc which is adapted to be supported by said bolts.

2. A wheel engaging plate for a spare wheel carrier, said plate being substantially triangular in shape and having a hole adjacent each corner and having a flat part punched from its mid portion and bent into a plane at substantially a right angle to that of said plate.

3. A wheel engaging plate for a spare wheel carrier, said plate being substantially triangular in shape and having a hole adjacent each corner and having a flat part punched from its mid portion and bent into a plane at substantially a right angle to that of said plate, the corners of which are cambered in a direction opposite that in which said punched out portion extends.

In testimony whereof, I have hereunto set my hand, this 24th day of April, 1926.

ERLE K. BAKER.